United States Patent [19]

Crane

[11] 4,081,117
[45] Mar. 28, 1978

[54] SADDLE BAG BRACKET

[75] Inventor: Dale Everett Crane, Venice, Calif.

[73] Assignee: Lear Siegler, Inc., Mendon, Mich.

[21] Appl. No.: 745,267

[22] Filed: Nov. 26, 1976

[51] Int. Cl.² .............................................. B62J 11/00
[52] U.S. Cl. .................................. 224/39; 224/32 A;
248/311.1 R; 280/289 A
[58] Field of Search .................. 224/30 R, 30 A, 31,
224/32 R, 32 A, 35, 36, 39, 41, 42, 42.45 R,
42.46 R, 43, 44; 280/202, 289 R, 289 A;
248/311.1, 360, 225.1

[56] References Cited

U.S. PATENT DOCUMENTS

| 2,016,421 | 10/1935 | Eichner | 248/225.1 X |
| 2,316,389 | 4/1943 | Atkinson | 248/311.1 X |
| 2,577,560 | 12/1951 | Ashdowne | 280/202 X |
| 2,721,718 | 10/1955 | Wagner | 248/311.1 X |
| 2,944,712 | 7/1960 | Glenny | 224/32 A |
| 3,346,156 | 10/1967 | Jones | 224/39 R X |
| 3,786,972 | 1/1974 | Alley | 224/44 X |

FOREIGN PATENT DOCUMENTS

| 656,020 | 12/1928 | France | 224/32 A |
| 1,087,339 | 2/1955 | France | 224/42.45 R |

*Primary Examiner*—Trygve M. Blix
*Assistant Examiner*—Winston H. Douglas

*Attorney, Agent, or Firm*—Reising, Ethington, Barnard, Perry & Brooks

[57] ABSTRACT

A bracket of the disclosure is universally adaptable for mounting saddle bags on cycles made by different manufacturers and having different sizes and designs. A first mounting portion of the bracket includes an inboard end portion with a mounting hole therethrough specifically designed for attachment to a first location on the cycle at its shock absorber. A second mounting portion of the bracket also includes a mounting hole therethrough and is secured to a second location of the cycle, preferably at its taillight mount, by a pair of L-shaped mounts. Each mount includes a pair of perpendicular legs with respective mounting openings therethrough and at least two of the mounting openings are formed to permit adjustable connections to be made to their legs. These adjustable mounting openings may be formed as spaced holes along the legs or as elongated slots. Securement bolts adjustably secure first legs of the mounts to each other in a laterally adjustable manner and respectively secure second legs of the mounts to the second bracket mounting portion and the second location on the cycle in a vertically and/or longitudinally adjustable manner. Additional mounting holes through the bracket receive securement bolts that secure the saddle bag to the bracket. One embodiment of the bracket has a construction specifically designed for relatively large saddle bags and another embodiment has a construction specifically designed for relatively small saddle bags.

4 Claims, 4 Drawing Figures

SADDLE BAG BRACKET

BACKGROUND OF THE INVENTION

1. Field of the Invention

The present invention relates to brackets for securing saddle bags to cycles.

2. Description of the Prior Art

Saddle bags are conventionally mounted on cycles such as motorcycles to provide cargo space for the traveling cyclist. For the most part, current day saddle bags are manufactured with a molded plastic construction and are mounted on a cycle by brackets on one and/or the other side of the rear wheel. A large number of brackets has heretofore been necessary in order to permit mounting of the saddle bags on each different make and size cycle commercially available. Large inventories of the brackets must thus be carried by distributors and retailers to ensure availability of the brackets to cyclists wishing to purchase and use saddle bags with their cycles.

SUMMARY OF THE INVENTION

An object of the present invention is to provide an improved saddle bag bracket that is universally adaptable for mounting saddle bags on different size and make cycles.

In carrying out the above object, the saddle bag bracket includes a bracket attachment portion for attaching a cycle saddle bag thereto and also includes a first bracket mounting portion connected to the bracket attachment portion and having provisions for mounting the bracket at a first location on a cycle. A second bracket mounting portion connected to the bracket attachment portion is mounted to the cycle at a second location by a pair of L-shaped mounts. Each mount includes a pair of perpendicular legs that each have a mounting opening. At least two of the mounting openings are formed to permit adjustable connections to be made to their legs. Securement members, preferably cooperable bolts and nuts, adjustably secure first legs of the mounts to each other and the second leg of one mount to the second bracket mounting portion as well as the second leg of the other mount to the second location on the cycle. Adjustment of the mounts at the adjustable mounting openings thereof makes the bracket adjustable both laterally with respect to the cycle as well as vertically and/or longitudinally with respect thereto in order to provide the universal usage thereof with different size and make cycles. Either elongated slots in the mount legs or spaced holes along the legs may form the mounting openings utilized to provide the adjustable connections in cooperation with the securement bolts.

In its preferred form, the first mounting portion of the bracket is provided by a bracket member that is bent inwardly with an inboard end which projects forwardly and has a mounting hole therethrough for securing the bracket to a shock absorber by a nut and bolt securement. At the second bracket mounting portion, each leg of the two L-shaped mounts may have its mounting opening formed as spaced holes or an elongated slot to provide for greater lateral, vertical, and longitudinal adjustment of the connection provided by the mounts between the bracket and the cycle. As preferably utilized, the mounts secure the second bracket mounting portion to the taillight mount of the cycle rearward of the shock absorber.

One preferred embodiment of the bracket that is specifically designed for larger saddle bags includes flat upper and lower main bracket members that extend horizontally. A flat inclined front bracket member is welded to both of the main bracket members and includes a forward extremity that is bent inwardly and has an inboard end projecting forwardly with a mounting hole therethrough so as to provide the first bracket mounting portion. A flat rear bracket member is welded to the upper and lower bracket members rearwardly of the inclined bracket member and has a mounting hole therethrough for providing the second bracket mounting portion. At least two additional mounting holes through the bracket members are provided for securement of the saddle bag to the bracket by securement bolts and nuts. A bolt and nut that secure one of the L-shaped mounts to the bracket also cooperate in securing the saddle bag to the bracket.

Another embodiment of the bracket specifically designed for mounting smaller saddle bags includes a flat horizontally extending main bracket member and a flat vertically extending secondary bracket member that is welded to the main bracket member to define a generally T shape. A front extremity of the main bracket member extends inwardly and has an inboard end projecting forwardly with a mounting hole therethrough for providing the first mounting portion which is adaptable for attachment to the cycle shock absorber. A rear end of the main bracket member includes a mounting hole therethrough for providing the second bracket mounting portion. A bolt and cooperable nut that secure one of the L-shaped mounts to the second mounting portion also secure the saddle bag to the bracket. At least two additional mounting holes in the bracket members are provided so that securement bolts and nuts can cooperate in securing the saddle bag to the bracket.

The objects, features and advantages of the present invention are readily apparent from the following detailed description of the preferred embodiments taken in connection with the accompanying drawings.

DETAILED DESCRIPTION OF THE PREFERRED EMBODIMENTS

Figure 1:
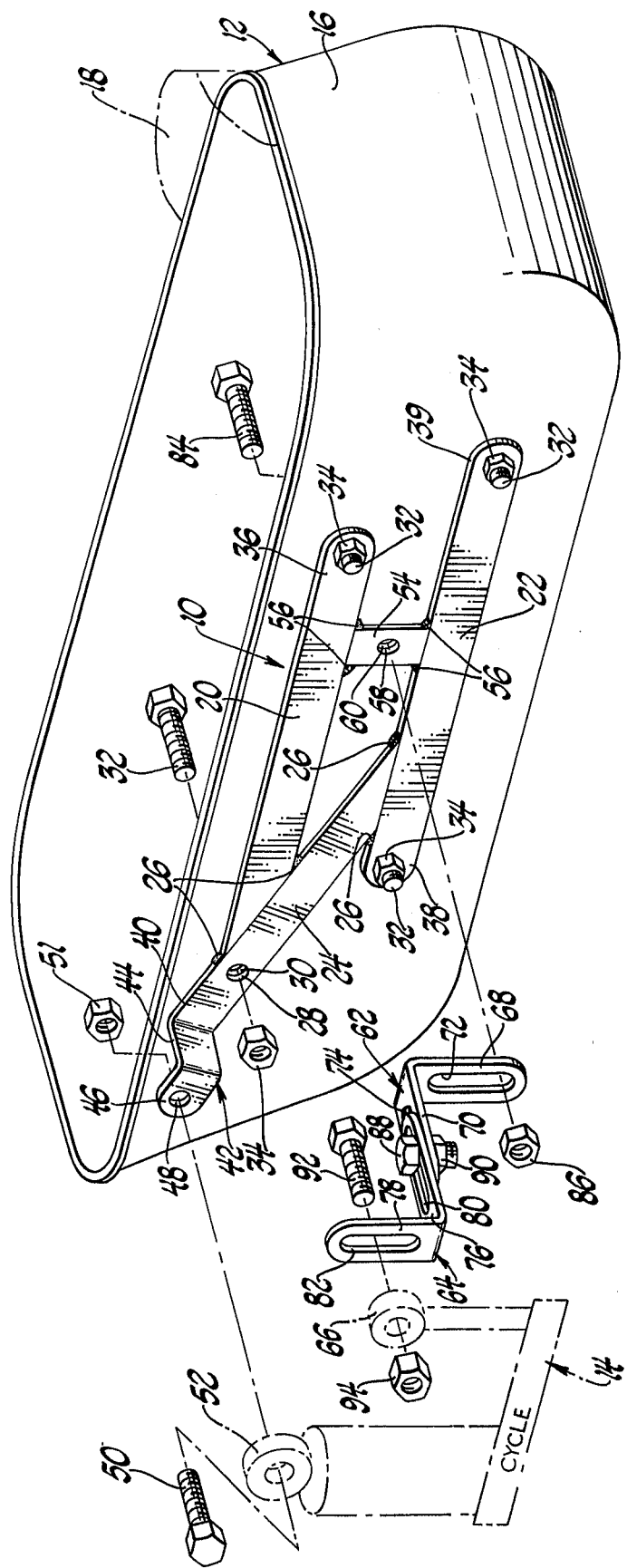
FIG. 1 is a perspective view of one cycle saddle bag mounting bracket constructed according to the present invention.

Referring to FIG. 1, a cycle saddle bag bracket constructed according to the present invention is collectively indicated by reference numeral 10 and is used to mount a relatively large saddle bag 12 on a schematically indicated cycle 14. As shown, the saddle bag is of a molded plastic construction and includes a lower receptacle 16 which opens upwardly and is closed during use by an upper closure 18 shown partially in phantom lines.

Bracket 10 includes flat upper and lower main bracket members 20 and 22 that extend in a generally horizontal direction forwardly and rearwardly with respect to the cycle when mounted. An inclined bracket member 24 is secured by welds 26 to the upper and lower bracket members 20 and 22. Bracket members 20, 22 and 24 include mounting holes 28 (only one shown) aligned with respective mounting holes 30 in the saddle bag receptacle 16 so as to receive securement bolts 32 that are secured by cooperable nuts 34. Lock washers (not shown) are also preferably utilized to secure the connections provided by bolts and nuts 32 and 34. These bracket members 20, 22 and 24 thus function as a bracket attachment portion for securing the bracket to the saddle bag 12. As shown, the upper main bracket member 20 has a rear end 36 secured by a nut and bolt connection 32 and 34 as are the front and rear ends 38 and 39 of the lower main bracket member 22. Likewise, just rearward of a forward extremity 40 on the inclined bracket member 24, another nut and bolt connection 32 and 34 secures the saddle bag to the bracket.

At its forward extremity 40 as shown in FIG. 1, the inclined bracket member 24 includes a first bracket mounting portion 42. An inwardly bent arm 44 of mounting portion 42 extends inwardly from the rest of bracket member 24 and an inboard end 46 of this mounting portion projects forwardly and has a mounting hole 48. A securement bolt 50 extends through mounting hole 48 and through a first location on the cycle 14, preferably at the upper shock absorber end 52 shown, and a nut 51 secures the bolt to mount the bracket to the cycle. A lock washer (not shown) is best utilized to secure the connection provided by bolt and nut 50 and 51 with either the bolt head or the nut located between the mounting portion end 46 and the saddle bag while the other is located just inboard from the shock absorber end.

A flat rear bracket member 54 shown in FIG. 1 has upper and lower ends secured by welds 56 to the upper and lower bracket members 20 and 22 rearward from the front inclined bracket member 24. Rear bracket member 54 thus provides support to the main bracket members 20 and 22. A mounting hole 58 in bracket member 54 is aligned with a mounting hole 60 in the saddle bag receptacle 16 to provide a second mounting portion for securing bracket 10 to cycle 14.

Figure 3:
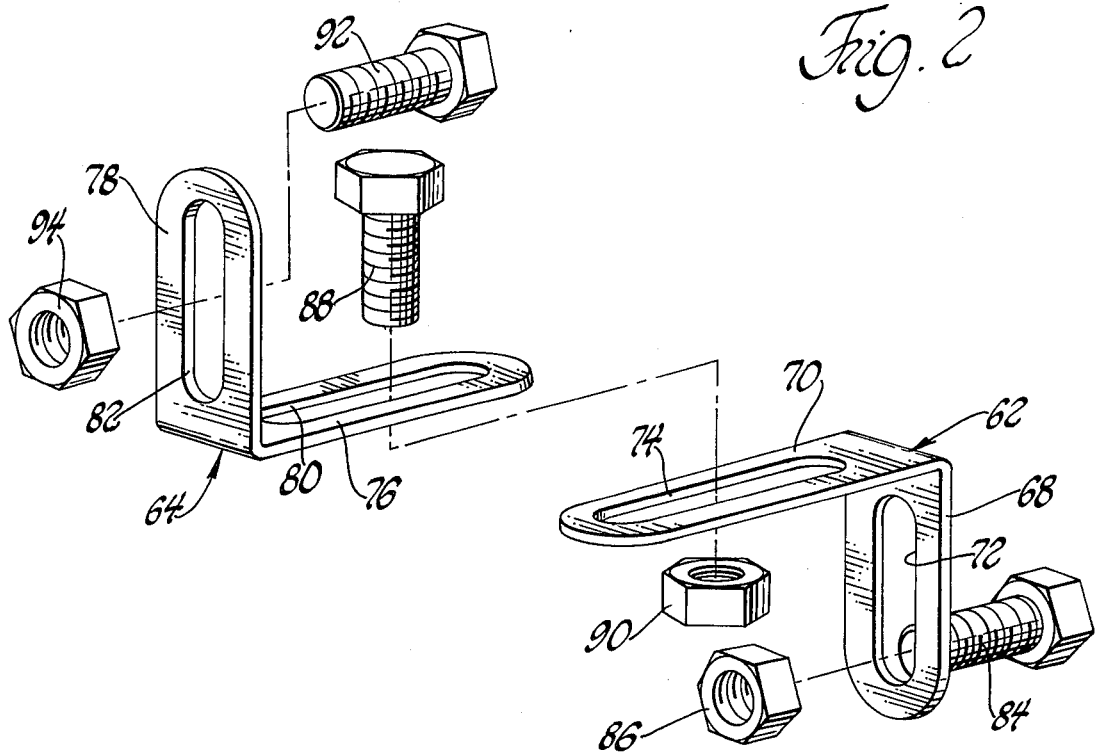
FIG. 3 is an exploded perspective view of L-shaped mounts used with both the FIG. 1 and FIG. 2 embodiments of the bracket.

A pair of L-shaped mounts 62 and 64 shown in FIG. 1 are utilized to secure the rear bracket member 54 to the cycle 14 at a second location spaced from the shock absorber end, this second location preferably being at the rear taillight mount 66. Mount 62, as can be seen by additional reference also to FIG. 3, includes a pair of perpendicular legs 68 and 70 that have respective mounting openings 72 and 74 in the form of elongated slots. Mount 64 likewise has a pair of perpendicular legs 76 and 78 with respective mounting openings in the form of elongated slots 80 and 82. A securement bolt 84 extends through the aligned mounting holes 58 and 60 (FIG. 1) in the rear bracket member 54 and the saddle bag receptacle 16 and through the mounting slot 72 in the mount leg 68 so as to be secured by the nut 86 shown and an unshown lock washer and thereby connect this mount to the bracket. Another securement bolt 88 extends through the elongated slot 74 in the other leg 70 of mount 62 after first passing through the elongated slot 80 in the leg 76 of mount 64. A nut 90 shown secures bolt 88 in cooperation with an unshown lock washer. Elongated slot 82 in the leg 78 of mount 64 receives a bolt 92 that also extends through the taillight mount 66 (FIG. 1) and is secured by the nut 94 shown and an unshown lock washer. During assembly, each of the connections of mounts 62 and 64 can be adjustably positioned as required for mounting on the particular cycle with which the saddle bag bracket 10 is utilized. After adjustment to the proper position, the nut and bolt connections are tightened to secure the bracket and the saddle bag 12 in position.

During the mounting of the bracket 10 shown in FIG. 1 on the cycle 14, the nut and bolt connection 88 and 90 through the elongated slots 74 and 80 in mount legs 70 and 76 provides for lateral adjustment that accommodates the mounting to the particular cycle with which the bracket is being utilized. Likewise, the nut and bolt connection 84 and 86 of the rear bracket member 54 with the elongated slot 72 in the leg 68 on mount 62 provides for vertical and/or longitudinal adjustment relative to the cycle depending upon the orientation of the mount. Similarly, the nut and bolt connection 92 and 94 through the elongated slot 82 in the leg 78 of mount 64 and through the taillight mount 66 also provides for vertical and/or longitudinal adjustment relative to the cycle depending on the orientation of this mount. As shown, the leg 68 on mount 62 and the leg 78 on mount 64 project in opposite directions from each other; however, the connection between the legs 70 and 76 of these mounts can also be made with legs 68 and 78 projecting in the same direction as each other if required by the configuration of the particular cycle with which the bracket is being used. Similarly, the mount legs 68 and 78 can be inclined in either a forward or rearward direction extending from the rear bracket member 54 to the taillight mount 66 as required. Universal mounting is thus obtained by the use of the two L-shpaed mounts 62 and 64.

Although each of the mounts 62 and 64 shown in FIG. 1 has each of its mounting openings provided in the form of elongated slots, it is possible to have universal mounting ability with only two of the mounting openings formed as elongated slots and the others as round holes. One mounting opening in the form of an elongated slot must be provided in one of the bracket legs 70 and 76 to provide for lateral adjustment of the mounting. Another mounting opening in the form of an elongated slot must be provided in either the leg 68 of mount 62 or in the leg 78 of mount 64 in order to provide for vertical and/or longitudinal adjustment of the mounting. However, by having each of the legs with its mounting opening in the form of an elongated slot, greater lengths of adjustment are possible than if only two slots are provided.

Figure 2:
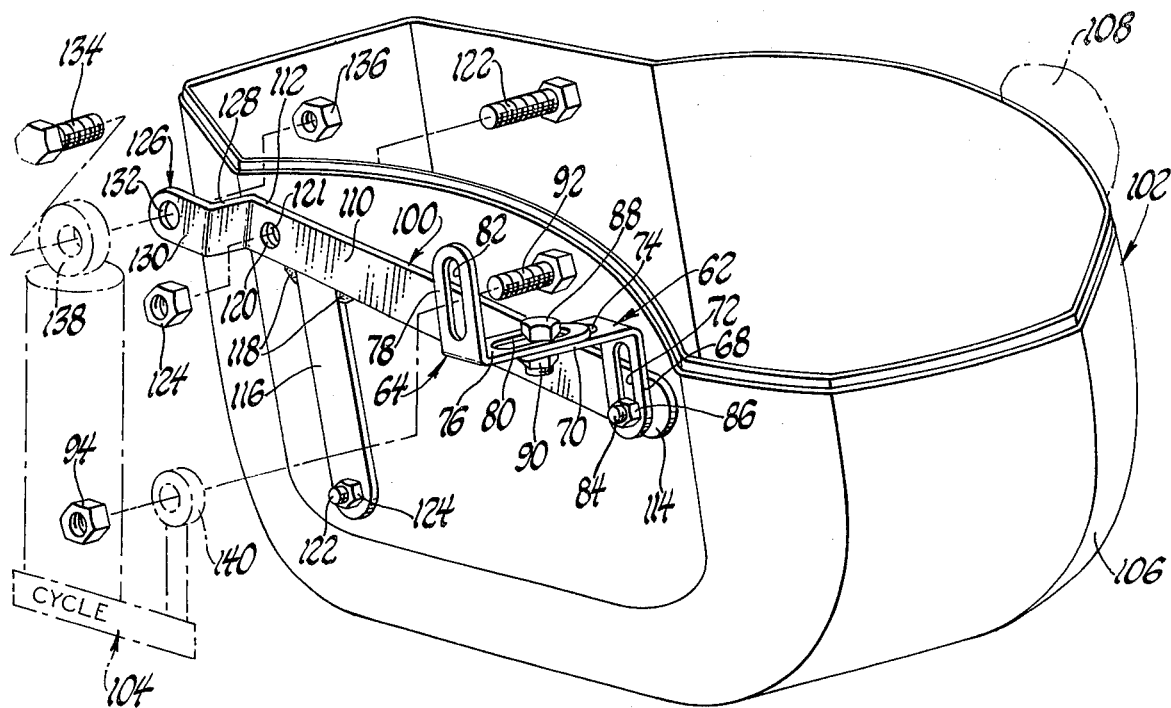
FIG. 2 is a perspective view of another embodiment of a cycle saddle bag mounting bracket according to the present invention.

With reference to FIG. 2, another embodiment of a cycle saddle bag mounting bracket is indicated collectively by 100 and is used to secure a relatively small saddle bag 102 to a schematically indicated cycle 104. Saddle bag 102 is made of a molded plastic construction and includes a lower receptacle 106 that opens upwardly and is closed by a cooperable upper closure 108 indicated partially by phantom lines.

A flat horizontally extending main bracket member 110 of the bracket 100 shown in FIG. 2 has a slightly inclined orientation with a higher elevation at its forward extremity 112 than at its rear end 114. A flat vertically extending secondary bracket member 116 is secured to bracket member 110 by welds 118 to form a somewhat skewed but generally T shape. The lower end of bracket member 116 and the forward extremity 112 of bracket member 110 include mounting holes 120 (only one shown) in alignment with respective mounting holes 121 in the saddle bag receptacle 106. Securement bolts 122 extends through the mounting holes 120 and 121 and are secured by the cooperable nuts 124 shown and unshown lock washers to secure the saddle bag to the bracket. Bracket members 110 and 116 thus function as a saddle bag attachment portion of the bracket.

A first bracket mounting portion 126 is shown in FIG. 2 on the main bracket member 110 at its forward extremity 112. Mounting portion 126 includes an arm 128 that is bent inwardly and an inboard end 130 which projects forwardly and has a mounting hole 132. A securement bolt 134 extends through the mounting hole 132 and is secured by the nut 136 shown as well as an unshown lock washer after passing through a first location on the cycle 104, preferably at the upper end 138 of the shock absorber, to secure the bracket to the cycle. Either the head of bolt 134 or the nut 136 is located between the first bracket mounting portion end 130 and the saddle bag 102 with the other located just inboard from the shock absorber end.

The L-shaped mounts 62 and 64 shown and described in connection with the mounting bracket embodiment of FIG. 1 are also used with the bracket 100 shown in FIG. 2. A mounting hole in the rear end 114 of main bracket 110 provides a second mounting portion for the bracket and is aligned with a hole in the saddle bag receptacle 106 so as to receive the securement bolt 84 that is secured by nut 86 and an unshown lock washer. Bolt 84 and nut 86 thus cooperate with bolt and nut connections 122 and 124 in securing the saddle bag to the bracket. Securement bolt 88 secures the mounts 62 and 64 to each other in cooperation with the nut 90 and an unshown lock washer in the same manner previously described. Likewise, securement bolt 92 and the nut 94 shown as well as an unshown lock washer secure the mount 64 to a second location of the cycle 104 spaced from the first location, preferably at the taillight mount 140. Adjustment of the nut and bolt connections for mounts 62 and 64 allows universal adaptation of the bracket 100 for mounting on different size and makes of cycles in the same manner previously described in connection with the embodiment of FIG. 1. Thus, lateral adjustment is provided by the nut and bolt connection 88 and 90 between the mounts 62 and 64 while vertical and/or longitudinal adjustment relative to the cycle is provided by the nut and bolt connection 84 and 86 as well as the nut and bolt connection 92 and 94.

Figure 4:
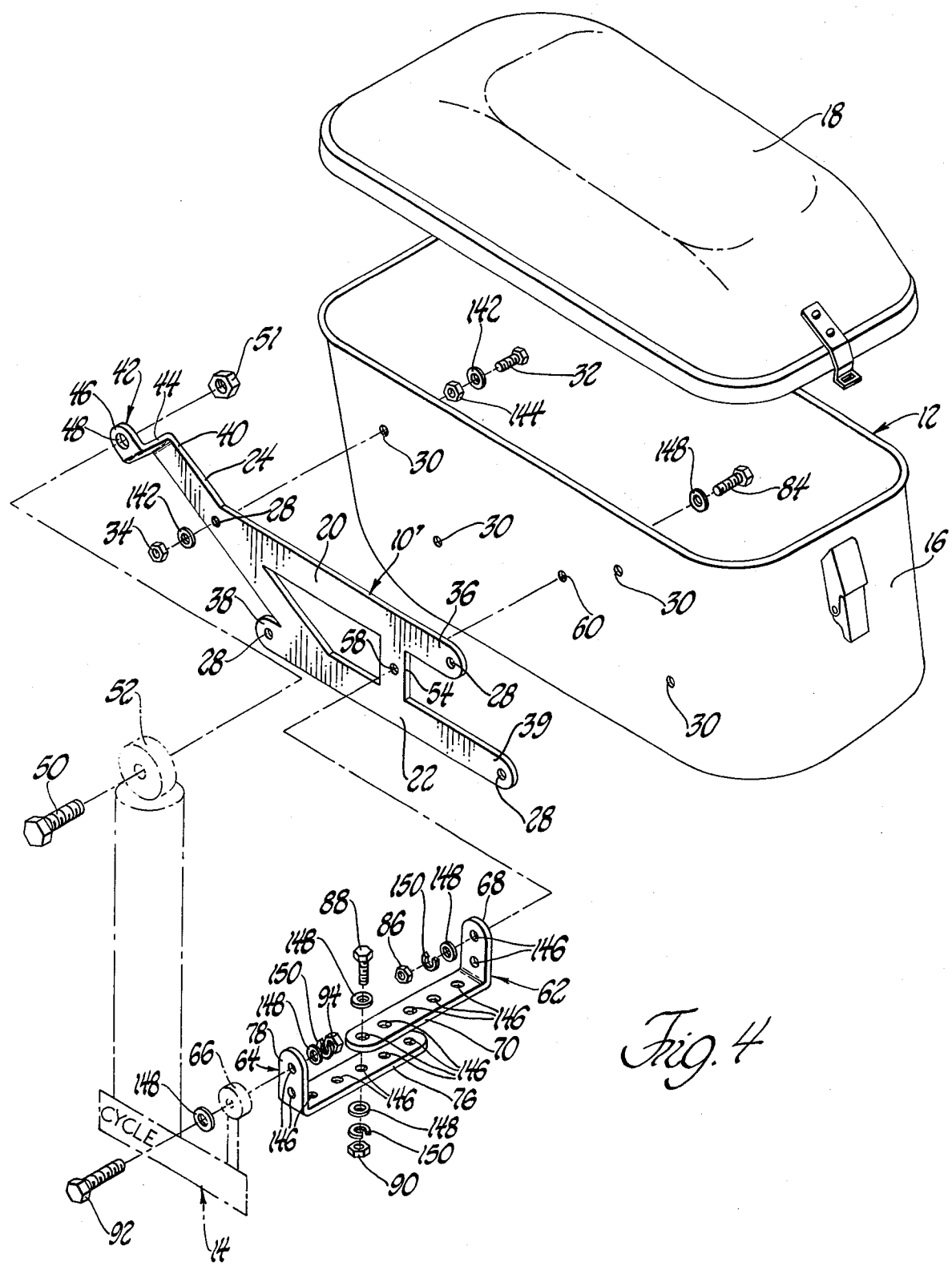
FIG. 4 is an exploded perspective view of the bracket embodiment of FIG. 1 but with modified L-shaped mounts.

With reference to FIG. 4, another embodiment of the bracket 10' is similar to the bracket embodiment 10 shown in FIG. 1 except for variations that will be mentioned. As such, like components and parts of both of these brackets bear similar reference numerals. Rather than being of a welded construction from separate brackets, the upper and lower bracket members 20 and 22, the inclined bracket member 24, and the rear bracket member 54 are made with a unitary construction by a suitable stamping operation. Each mounting hole 28 of this bracket is secured to the bag receptacle 16 by a securement bolt 32 that extends outwardly through the associated receptacle mounting hole 30 to be secured by a nut 34 in cooperation with a pair of washers 142 and a grommet 144, only one set of the bolt, nut, washers and grommet being shown in the drawing. The first bracket mounting portion 42 is secured by bolt 50 and a cooperable nut 51 to the shock absorber end 52 in the same manner previously discussed.

L-shaped mounts 62 and 64 are modifications of the mounts utilized with the bracket embodiments of FIGS. 1 and 2. Legs 68 and 70 of mount 62 are oriented perpendicular to each other as are the legs 76 and 78 of mount 64 in the same manner as with the other mounts. However, holes 146 spaced along each mount leg 68, 70, 76, and 78 function as the mounting openings that permit adjustable connection of the bracket 10' to the taillight mount 66. Thus, each securement bolt 84, 88, and 92 and their associated nuts 86, 90, and 94 extended through selected holes 146 in order to provide the bracket securement. Pairs of flat washer 148 and a lock washer 150 utilized with each of these bolts secure the connection.

It should be noted that there is nothing critical about the particular orientations of the mounts 62 and 64 as shown in FIG. 4 in securing the bracket 10' to the taillight mount 66. These mounts may be oriented as required with one leg 68 or 70 of mount 62 secured to the bracket 10' and the other leg thereof secured to one of the legs 76 and 78 of mount 64. Likewise, the other leg of mount 64 is secured to the taillight mount 66. Since the adjustment permitted by mount 62 and 64 is incremental, saddle bag 12 may have its rear end spaced laterally inboard or outboard of its front end as well as slightly above or below it. Universal mounting capability is nevertheless provided by these mounts in cooperation with the bracket 10'.

It should be noted that both of the mounting brackets 10 and 100 disclosed are designed for mounting right-hand saddle bags on the right-hand side of a cycle rear wheel. However, brackets symmetrical to the ones disclosed are also used to mount left-hand saddle bags on the left-hand side of a cycle rear wheel.

While preferred embodiments of the cycle saddle bag mounting bracket have herein been described in detail, those skilled in the art will recognize various alternative designs and embodiments for practicing the present invention as defined by the following claims.

What is claimed is:

1. A cycle saddle bag bracket comprising: upper and lower main bracket members that extend horizontally; an inclined front bracket member that extends between the main bracket members and includes a forward extremity which is bent inwardly and has an inboard end projecting forwardly with a mounting hole therethrough so as to provide a first bracket mounting portion for mounting the bracket on a first location on a cycle; a rear bracket member that extends vertically between the upper and lower main bracket members rearward of the inclined bracket member; the rear bracket member having a mounting hole therethrough for providing a second bracket mounting portion; at least two additional mounting holes through the bracket members; a pair of L-shaped mounts; each mount including a pair of perpendicular legs; each leg having a mounting opening therethrough; at least two of said mount legs having the mounting openings thereof formed to provide adjustable connections therealong; nut and bolt sets for adjustably securing first legs of the mounts to each other and for adjustably securing the second leg of one mount to a second location on the cycle spaced from the first location; cooperable nut and bolt sets for securing the bracket to a saddle bag with the bolts extending through associated bracket mounting holes; and another nut and bolt set securing the bracket to the saddle bag and the second leg of the other mount to the bracket with the bolt thereof extending through the mounting hole of the rear bracket member.

2. A cycle saddle bag bracket comprising: upper and lower horizontally extending main bracket members; an inclined front bracket member that extends between the main bracket members; the inclined bracket member including a first bracket mounting portion at the forward extremity thereof; said first bracket mounting portion being bent inwardly and having an inboard end that projects forwardly with a mounting hole therethrough so as to be attachable to a first location on a cycle; a rear bracket member that extends vertically between the upper and lower main bracket members; the rear bracket member including a mounting hole therethrough so as to provide a second bracket mounting portion; at least two additional mounting holes in the bracket members; a pair of L-shaped mounts for adjustably securing the second bracket mounting portion to a second location on the cycle spaced from the first location; each mount including a pair of perpendicular legs; each leg having a mounting opening therethrough; at least two of said mount legs having the mounting openings thereof formed as mounting holes spaced therealong; and cooperable nuts and bolts for securing the bracket to a saddle bag and to the first location on the cycle as well as to the second location with the L-shaped mounts, the bolts extending through the mounting holes to provide the bracket securement to the saddle bag and the bracket securement between the first bracket mounting portion and the first location on the cycle, one of the bolts extending through mounting openings in first legs of the mounts and at least one of the openings thereof being one of the spaced mounting holes to thereby provide lateral adjustment to the securement therebetween, two other bolts respectively extending through the mounting openings in the second legs of the mounts to secure the mounts to the second bracket mounting portion and the second location on the cycle, and at least one of the mounting openings of the second mount legs being one of the spaced mounting holes to thereby provide vertical and/or longitudinal adjustment to the securement provided by the mounts.

3. A bracket as in claim 2 wherein each leg of the L-shaped mounts has mounting holes spaced therealong.

4. A cycle saddle bag bracket comprising: upper and lower main bracket members; an inclined front bracket member that extends between the main bracket members; the inclined bracket member including a first bracket mounting portion at the forward extremity thereof; said first bracket mounting portion being bent inwardly and having an inboard end that projects forwardly with a mounting hole therethrough so as to be attachable to a first location on a cycle; a rear bracket member that extends vertically between the upper and lower main bracket members; the rear bracket member including a mounting hole therethrough so as to provide a second bracket mounting portion; at least two additional mounting holes in the bracket members; a pair of L-shaped mounts for adjustably securing the second bracket mounting portion to a second location on the cycle spaced from the first location; each mount including a pair of perpendicular legs; each leg having a plurality of mounting holes spaced therealong; and cooperable nuts and bolts for securing the bracket to a saddle bag and to the first location on the cycle as well as to the second location with the L-shaped mounts, the bolts extending through the mounting holes to provide the bracket securement to the saddle bag and the bracket securement between the first bracket mounting portion and the first location on the cycle, one of the bolts extending through selected mounting holes in first legs of the mounts to thereby provide lateral adjustment to the securement therebetween, another one of the bolts extending through a selected mounting hole in the second leg of one of the mounts and through the rear bracket member mounting hole of the second bracket mounting portion as well as through a hole in the saddle bag to provide vertically and/or longitudinally adjustable bracket securement to the bag and the one mount, and a further one of the bolts extending through a selected mounting hole in the second leg of the other mount to provide vertically and/or longitudinally adjustable securement to the second location on the cycle.

* * * * *